United States Patent Office 3,705,040
Patented Dec. 5, 1972

3,705,040
PROCESS OF EXTRACTING MEAT FROM CRUSTACEANS PARTICULARLY SHRIMP
Peter W. Bynagte, San Diego, Calif., assignor to Westgate-California Foods, Inc.
No Drawing. Filed Oct. 19, 1970, Ser. No. 82,096
Int. Cl. A22c 29/00
U.S. Cl. 99—111                4 Claims

ABSTRACT OF THE DISCLOSURE

The process of extracting the meat from crustaceans, particularly shrimp, wherein the shrimp are dipped into a solution of water, sodium acid pyrophosphate or calcium acid pyrophosphate and sodium tripolyphosphate or sodium metaphosphate or sodium hexametaphosphate or sodium trimetaphosphate or sodium orthophosphate for a period of at least two minutes during which time the solution is agitated, and then cooked for at least two minutes and then cooled and peeled.

BACKGROUND OF THE INVENTION

In processing shrimp, shrimp are taken from the ocean, boiled and the crust or shell is then removed manually. Since this operation requires considerable time, labor and expense, mechanical shelling devices are now being used. In using mechanical shelling devices, the shrimp is normally taken directly from the ocean, is heated by steam or hot water for a short period of time and is then placed on a machine with rollers or like devices that remove the skin and shell. The machine presses down on the shell to crack it and to get hold of the shell. But since the shrimp meat hasn't been cooked, it often breaks up. As is well known, broken shrimp meat is less valuable than whole shrimp meat in the non-broken condition. So there is a certain amount of loss that occurs because the shrimp meat has been broken up during processing.

The alternative to the use of the machine is to hand peel the shrimp. But this is very costly and can only be employed where the hand processed shrimp meat is recovered in substantially whole form, and can be sold on the market as that type of product. There is a large demand for shrimp meat in the "whole" condition. Thus it is advantageous to have a new process for removing shrimp meat from the skin and crust or shell, in a quicker and more efficient manner in a "whole" condition.

SUMMARY OF THE INVENTION

In the process of this invention, the shrimp are taken from the water and are placed in a solution comprising a first part of water a second part comprising particular acid pyrophosphates, and a third part comprising particular sodium phosphates. The particular acid phosphates of part two are sodium acid pyrophosphate or calcium acid pyrophosphate and the particular sodium phosphates in the third part are sodium tripolyphosphate or sodium metaphosphate or sodium hexametaphosphate or sodium trimetaphosphate or sodium orthophosphate. The percentage of the parts of the solution range from two percent to thirty percent by weight of the second part and two percent to fifteen percent by weight of the third part with the remainder comprising water that may be fresh water or salt water having a sodium chloride content of about three percent by weight of the water. The shrimp are soaked in the solution for at least two minutes and the solution agitated normally by air bubbling through the solution. The shrimp are then removed from the solution and cooked for three minutes and then cooled and peeled.

In using this process, it has been found that in hand peeling shrimp, remarkably improved results have occurred. The solution reduces the strength of the underskin of the shrimp, allowing the crust and shell to be easily and quickly removed making the peeling easier. Thus not so many small pieces of shrimp meat are broken in the shell removal. Further it has been found that in this process, the red colored portions of the shrimp between the shell and the shrimp meat stays on the meat better and longer. This has become to many persons indicative of whole shrimp and the retaining of this colored portion increases its value. Thus the end product is improved.

It is therefore an object of this invention to provide a new and improved process for extracting meat from crustaceans, particularly shrimp.

It is another object of this invention to provide a new and improved process for extracting meat from crustaceans, particularly shrimp, that has a shorter processing time, is more economical, does not require complicated or expensive equipment and that removes the meat in substantially whole form with an improved coloration thereof.

It is another object of this invention to provide a new and improved process of extracting meat from crustaceans, particularly shrimp, that peels easier and does not result in so many small pieces of meat being broken in shell removal.

In the practice of this invention, the crustaceans, particularly shrimp, are taken from the water and placed in a solution comprising one part of water, a second part of particular acid pyrophosphates and a third part of particular sodium phosphates. The particular acid phosphates include sodium acid pyrophosphate or calcium acid pyrophosphate and the particular sodium phosphates of the third part comprise any of sodium tripolyphosphate, sodium metaphosphate, sodium hexametaphosphate, sodium trimetaphosphate, and sodium orthophosphate.

The percentage of the parts of the solution range from two percent to thirty percent by weight of the second part, two percent to fifteen percent by weight of the third part with the remainder comprising fresh water or salt water. The salt water may have a sodium chloride content of about three percent by weight of the water. The shrimp are soaked in the solution for at least two minutes. Normally the shrimp are soaked in the solution from two to ten minutes depending upon the size of the particular shrimp. The larger the shrimp, the longer time the shrimp would be soaked in the solution. While the shrimp may be soaked for long periods of time in the solution without damaging the shrimp meat, there is normally no economic justification for leaving the shrimp in the solution for excessively long periods of time. The action of the solution on the skin of the shrimp is normally increased by agitating the solution during the soaking. While there are many ways in which the solution may be agitated, it has been found particularly advantageous to bubble air through the solution. The shrimp are then removed from the solution and are cooked in a fluid such as water at a temperature near boiling for at least two minutes. The temperature of the water should be at least 200° Fahrenheit. The shrimp are then removed from the cooking solution, are cooled and then peeled. The shell or crust is removed by hand in the normal manner of peeling shrimp.

The time lag between the soaking in the solution and the cooking step is not particularly critical. But it is advantageous to cook the shrimp prior to peeling. The purpose of the solution soaking is to weaken the structure of the belly portion of the shrimp allowing the shell, crust and skin to be removed more easily.

The following are specific examples that serve to further illustrate the practice of the invention.

I

Twenty-five pounds of shrimp were placed in an agitating solution, which solution comprised by weight, ninety-six percent fresh water, two percent sodium acid pyrophosphate and two percent sodium tripolyphosphate. The shrimp were left in the solution about two minutes, and then removed. The shrimp were then cooked for about two minutes at a temperature of about 200° Fahrenheit. After cooling for one hour, six and one-half pounds of whole shrimp were recovered with about five percent broken.

As a contrast with mere boiling, twenty-five pounds of from the same catch were boiled with no solution treatment for about two to three minutes at the same temperature as above. The shrimp were then cooled and peeled. Five point three pounds of shrimp were recovered and twenty-five percent of the shrimp were broken.

II

In using the same process steps of Example I, the solution was varied in successive applications with sodium acid pyrophosphate in the amount of two percent, and with the sodium tripolyphosphate being replaced in successive separate examples by two percent of sodium metaphosphate, two percent of sodium hexametaphosphate, two percent of sodium trimetaphosphate and two percent of sodium orthophosphate. Further all of the various combinations of the third part were similarly used with calcium acid pyrophosphate in separate examples, and additionally by replacing fresh water with sea water. In all of these examples of practice of the invention, the same results are obtained, wherein about six and one-half pounds of whole shrimp were recovered with about five percent broken.

III

Twenty-five pounds of shrimp were placed in an agitated solution comprising by weight of about thirty percent calcium acid pyrophosphate and two percent sodium tripolyphosphate. The shrimp were held in the solution about three minutes, were then removed from the solution and were cooked at about boiling temperature for about three minutes. The shrimp were then removed and cooled for about one hour and were peeled. From the twenty-five pounds of shrimp, six point five pounds of whole shrimp were recovered. Again the various combinations listed in Examples I and II were used in the stated percentages for the second part and third part and also with the water being fresh water and then salt water. The same results were obtained.

The Examples of I and II above were made with two percent sodium acid pyrophosphate and fifteen percent sodium tripolyphosphate and the same results were obtained as were obtained in the examples. Also the various combinations were tried with shrimp in the amount of five pounds, and in each of the combinations the same percentage of yield of whole peeled shrimp were obtained with the same percentage being broken.

IV

Fifty pounds of shrimp were placed in a solution comprising by weight thirty percent sodium acid pyrophosphate and fifteen percent sodium tripolyphosphate. The balance of this solution was fresh water. The shrimp were treated in the solution with air bubbling through the solution and shrimp for a period of four minutes. The shrimp were then removed from the solution and were cooked for about three minutes in water having a temperature of about 205°. The shrimp were then cooled for one hour and peeled and twelve point eight pounds of whole shrimp were recovered with six percent being broken. This treatment in five pound units of shrimp were made in all of the combinations listed in Examples I and II. The percentage of recovery of shrimp meat and the broken percentage were the same.

V

One thousand pounds of shrimp were placed in a solution of two percent sodium acid pyrophosphate and two percent of sodium tripolyphosphate with the remainder comprising fresh water. The shrimp were left in the solution about eight minutes. The shrimp were then removed from the solution and were cooked for a period of about three minutes at a temperature of 212° Fahrenheit. The shrimp were then removed from the cooking solution and cooled for one and one-half hours. The shrimp were peeled in one hour and a twenty-six percent yield by weight of "whole" shrimp meat was recovered. By contrast, one thousand pounds of shrimp were cooked for about five minutes. The shrimp was cooled for one and one-half hours and was then peeled. A 23.5 percent by weight yield of shrimp meat was recovered and twenty percent of the shrimp being broken and it took one hour and thirty minutes to peel the shrimp.

Having described my invention, I now claim:

1. A process of extracting meat of shrimp, comprising,
   placing shrimp in a fresh water solution including about two percent to thirty percent by weight of sodium acid pyrophosphate or calcium acid pyrophosphate and about two percent to fifteen percent by weight of sodium tripolyphosphate or sodium metaphosphate or sodium hexametaphosphate or sodium trimetaphosphate or sodium orthophosphate for a time period of at least two minutes,
   removing said shrimp from said solution and cooking said shrimp for at least two minutes in water at a temperature of at least 200°,
   and peeling said shrimp.

2. The process of extracting meat of shrimp, as claimed in claim 1 including,
   agitating said solution around said shrimp.

3. The process of extracting meat of shrimp, as claimed in claim 2 in which,
   said solution is agitated by bubbling air through said solution.

4. The process of extracting meat of shrimp, as claimed in claim 1 in which,
   sodium chloride is added to said water in said phosphate solution in the amount of about three percent by weight of the water.

References Cited
UNITED STATES PATENTS

| | | | |
|---|---|---|---|
| 3,276,878 | 10/1966 | Lapeyre | 99—111 |
| 3,577,243 | 5/1971 | Bynagte | 99—111 |

JOSEPH M. GOLIAN, Primary Examiner

R. M. ELLIOTT, Assistant Examiner